United States Patent
Eng

Patent No.: US 6,209,946 B1
Date of Patent: Apr. 3, 2001

(54) LOCATER PIN

(75) Inventor: Yeap Chin Eng, Mont Albert (AU)

(73) Assignee: ITW Australia Pty. Ltd., Victoria (AU)

( * ) Notice: Subject to any disclaimer, the term of this patent is extended or adjusted under 35 U.S.C. 154(b) by 0 days.

(21) Appl. No.: 09/287,128

(22) Filed: Apr. 7, 1999

(30) Foreign Application Priority Data

Apr. 7, 1998 (AU) .................................................. PP2835

(51) Int. Cl.$^7$ ................................. B62D 25/04; B60J 7/00
(52) U.S. Cl. ................ 296/146.15; 296/201; 296/96.22; 52/204.551; 52/204.62
(58) Field of Search ............................ 296/201, 146.15, 296/96.22; 52/204.591, 204.62

(56) References Cited

U.S. PATENT DOCUMENTS

| 4,611,850 | * | 9/1986 | Fujikawa | 296/201 |
|---|---|---|---|---|
| 4,659,138 | * | 4/1987 | Goss et al. | 296/201 |
| 4,703,973 | * | 11/1987 | Fujikawa | 296/201 |
| 4,723,909 | * | 2/1988 | Kida et al. | 296/201 |
| 4,749,224 | * | 6/1988 | Kurihara | 296/201 |
| 4,779,919 | * | 10/1988 | Muller | 296/201 |
| 5,027,569 | * | 7/1991 | Keys | 296/201 |
| 5,042,871 | * | 8/1991 | Gotanda et al. | 296/201 |
| 5,205,095 | * | 4/1993 | Kessler | 296/201 |
| 5,475,956 | * | 12/1995 | Agrawal et al. | 296/201 |
| 5,531,496 | * | 7/1996 | Zbinden et al. | 296/201 |
| 5,851,045 | * | 12/1998 | Muramatsu | 296/201 |

FOREIGN PATENT DOCUMENTS

003213176 * 10/1983 (DE) ................................ 52/204.62

* cited by examiner

Primary Examiner—Joseph D. Pape
Assistant Examiner—Kiran B. Patel
(74) Attorney, Agent, or Firm—Lowe Hauptman Gilman & Berner, LLP

(57) ABSTRACT

The present invention provides a locater pin (1) for locating a first article such as a glass window panel (104) with respect to a second article such as a window frame (101) in a vehicle chassis (100). The pin (1) includes a head portion (2) for attachment to the glass panel (104) and an elongate stem portion (3) which extends from the head portion for receipt in an aperture (102,103) of the frame (101). In this way the pin is able properly locate the glass panel relative to the frame. The locater pin (1) further includes stress dissipation means (8) which is adapted to yield in the event that a stress load greater than a predetermined limit is transmitted through the pin between the glass panel (104) and the frame (101) to thereby prevent damage to the glass panel and/or the frame. The present invention also provides a window assembly incorporating such a locater pin (1), and a vehicle incorporating such a window assembly.

7 Claims, 3 Drawing Sheets

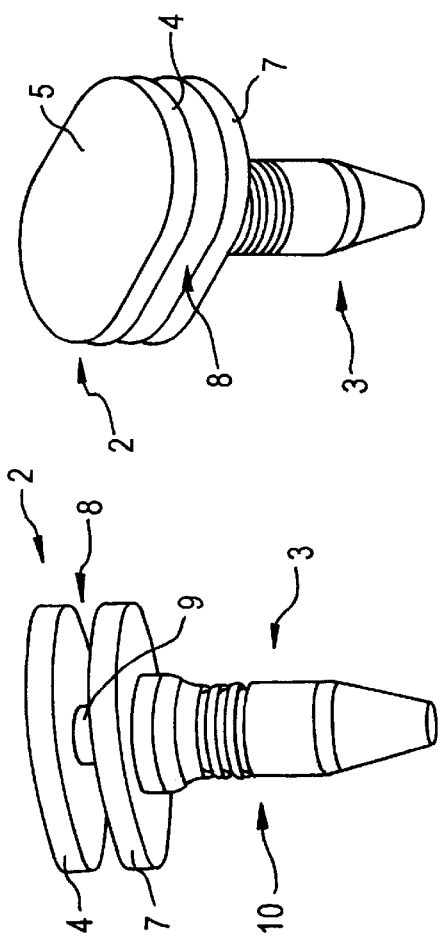
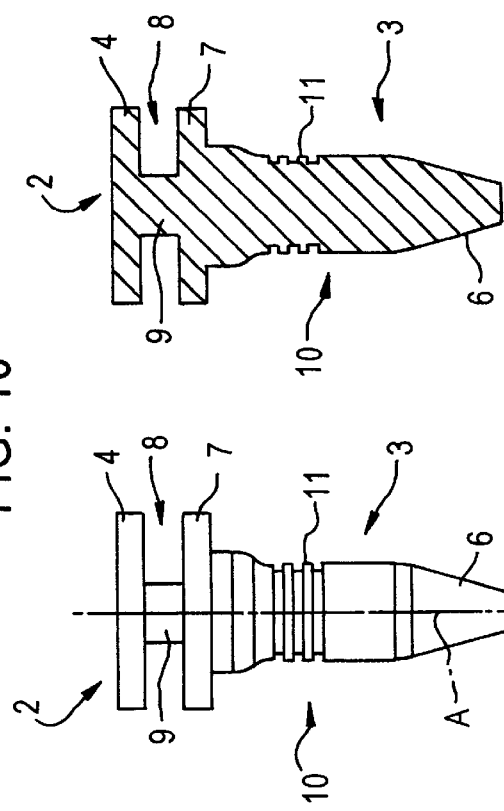
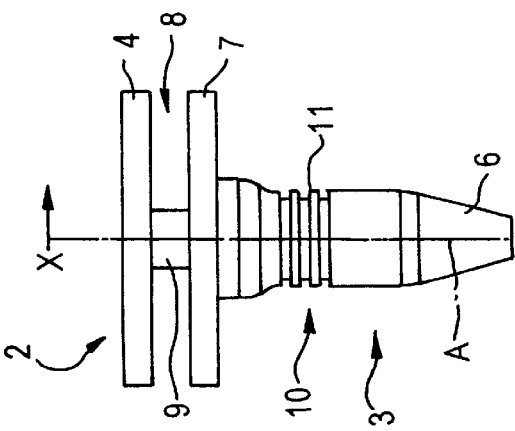
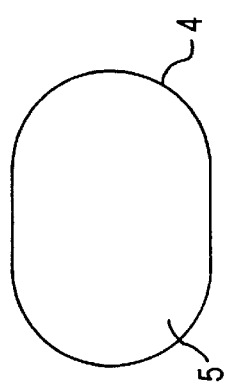

LOCATER PIN

TECHNICAL FIELD

The present invention relates to a pin or stud for locating one article with respect to another. The locater pin of the invention is particularly applicable to the task of positioning and locating a window pane or glass panel with respect to a metallic frame for that window in an automobile window assembly, and it will be convenient to herein describe the invention in relation to that exemplary application. It is to be appreciated however that the invention is not limited to that application.

BACKGROUND OF THE INVENTION

Locater pins are currently used in the automobile industry for positioning or locating fixed or static windows such as windscreens in the metal frames of a vehicle chassis during the window assembly process. The metal frames typically include two or more registration holes or slots. The locater pins include a flat head and an elongate stem extending from the head. In use, the flat head is rigidly adhered in face to face contact with the window glass at specific positions on the periphery of that glass panel. A sealing and bonding compound, such as urethane, is applied around the perimeter of the glass for bonding the panel to the frame. The glass panel with projecting pins can then be properly located in the frame by positioning the pins in their associated holes or slots in the frame. The pins eliminate the need for complex holding fixtures for maintaining the glass in position while the urethane cures.

One problem with the current arrangement, however, is that as the vehicle chassis trundles along the production line severe vibrations are often imparted to the glass panels sitting in the frames. The glass panels have limited movement due to the location of the rigidly attached pins in their associated holes, so the vibrations transmit stresses to the glass which is vulnerable to breakage. Breakage of the glass naturally delays the production process and increases overall production cost.

Another similar problem occurs during the service life of the vehicle. That is, vibration and chassis flexure which occur during ordinary vehicle operation induce stresses between the glass panel and the frame at the locater pins which can cause undesirable squeaking noises as well as failure of the glass.

It is therefore an object of the present invention to provide a solution to the above problems.

SUMMARY OF THE INVENTION

According to an aspect of the present invention there is provided a locater pin for locating a first article with respect to a second article. The pin has a head portion for attachment to the first article and an elongate stem portion extending from the head portion for receipt in an aperture of the second article to properly locate the first article with respect thereto. The pin further includes stress dissipation means adapted to yield in the event of excessive stress being transmitted through the pin between the first and second articles to thereby prevent damage to either or both of the articles.

The predetermined stress load beyond which the stress is considered to be "excessive" will naturally depend upon the strength of the first and second articles. Clearly the stress dissipation means of the pin should be adapted to operate at a stress level below that at which the weaker of the two articles will fail. In this way, at a predetermined stress load limit the stress dissipation means will yield thereby relieving transmission of that stress load to the articles. The stress dissipation means may be designed to yield in tension, in compression or in transverse shear, or in any combination thereof. In addition, the stress dissipation means may be adapted to yield resiliently or, alternatively, may be adapted to permanently yield.

In a preferred form of the invention the stress dissipation means is in the form of failure means adapted to enable the pin to fail (i.e. yield permanently) in the event that a stress load in excess of the predetermined limit is transmitted through the pin between the first and second articles. In a particularly preferred form of the invention the failure means is adapted to facilitate failure of the pin by fracture or breaking. It will be appreciated, however, that other modes of failure, such as by stretching or permanent deformation, are also contemplated by the present invention.

In one form of the invention the failure means is adapted for shear fracture transverse the longitudinal extent of the pin in response to excessive transverse stresses arising for example as a result of relative movement between the first and second articles. The failure means may be adapted to cause fracture of the pin in a region of the pin to be located between the first article and the second article. The failure means may be located between the head portion and the stem portion of the pin.

In one form of the invention the stem portion includes a flange member which extends radially outwards from a longitudinal axis of the pin, the flange member being adapted to seat against a peripheral edge region of the aperture in the second article. The flange member also serves to maintain the glass panel spaced at a set distance from the frame. The head portion preferably includes a plate member having a substantially flat top region for adhesive attachment in face-to-face relation to the first article.

In one form of the invention the failure means includes a weakened region or a region of reduced strength making the pin susceptible to fracture in that region. The failure means may therefore include a region of reduced pin cross-sectional area. The failure means may also include a notch for concentrating stress at the region of reduced pin cross-section. In one form of the invention the failure means includes a necked-in region extending between the flange member of the stem portion and the plate member of the head portion.

In one form of the invention the stem portion is tapered at a free end to assist insertion of the pin into the aperture of the second article. The aperture may be in the form of a hole, a slot, or some other opening. The locater pin of the invention may also include fastening means for retaining the pin in the aperture after its insertion. The fastening means may include barbs or projections from the pin's stem portion for engaging an underside of the peripheral edge region of the aperture. Alternatively, the fastening means may include a thread or circumferential ribs on the stem portion for engagement with a fastening element such as a star washer or a threaded nut.

In a preferred application of the present invention, the first article is a sheet of glass or glass panel for an automobile window assembly and the second article is the metal frame defining the window opening in a vehicle chassis. The frame includes a plurality of holes or slots for receiving locater pins according to the present invention. The locater pins are preferably made of a material which will readily break at the failure means under excessive stress before the glass itself is caused to break. The locater pins are desirably formed of a polymer plastic material such as nylon 66 and each pin may be formed as a unitary element in a moulding process.

According to another aspect of the present invention there is provided a window assembly for an automobile including a glass panel secured in a frame and including at least one locater pin as previously described with the head portion of the pin attached to the glass panel and the stem portion of the pin disposed in an aperture in the frame. The present invention also provides a vehicle which includes such a window assembly.

BRIEF DESCRIPTION OF THE DRAWINGS

For assistance in arriving at an understanding of the present invention embodiments of a locater pin and window assembly according to the invention is illustrated in the accompanying drawings. The preceding description of the locater pin and window assembly may be read with reference to those drawings. However, as the drawings illustrate embodiments only, their particularity is not to be understood as superseding the generality of the preceding description. In the drawings:

FIG. 6 is a front view of a locater pin according to an embodiment of the sent invention;

FIG. 7 is a top view of the locater pin of FIG. 6.

FIG. 8 is a side view of the locater pin of FIG. 6.

FIG. 9 is a sectioned side view of the locater pin of FIG. 6 in the direction arrows X—X; and FIGS. 10 and 11 are perspective views of the locater pin of FIG. 6.

DETAILED DESCRIPTION OF THE PREFERRED EMBODIMENTS

FIGS. 1 to 5 of the drawings illustrate schematically the use of a locater pin according to the invention in an automobile window assembly according to the invention.

Figure 1:
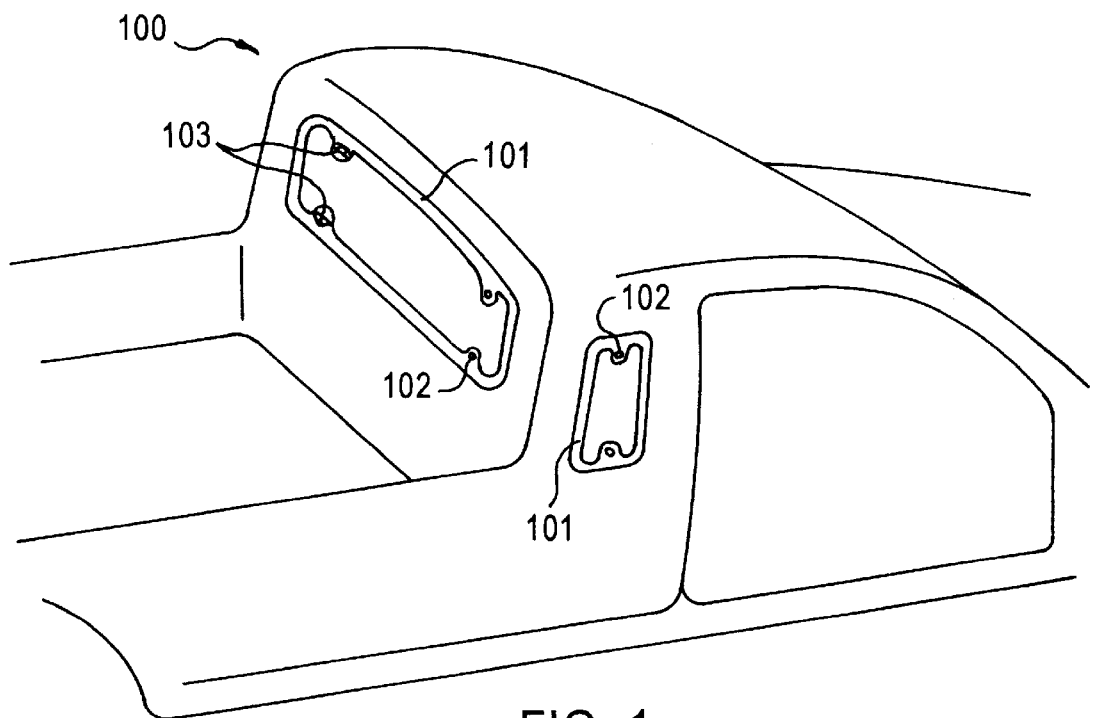
FIG. 1 is a perspective sketch of a utility vehicle or pick-up truck chassis.

FIG. 1 is a sketch of a utility vehicle or pick-up truck chassis (100) and shows the frames (101) for the rear 'back-light' window assembly and the 'quarter-light' side window assembly. Each of the frames (101) includes holes (102) or slots (103) for receiving a locater pin (1)—to be described in more detail with reference to FIGS. 6 to 11 later—attached to a glass window panel.

Figure 2:
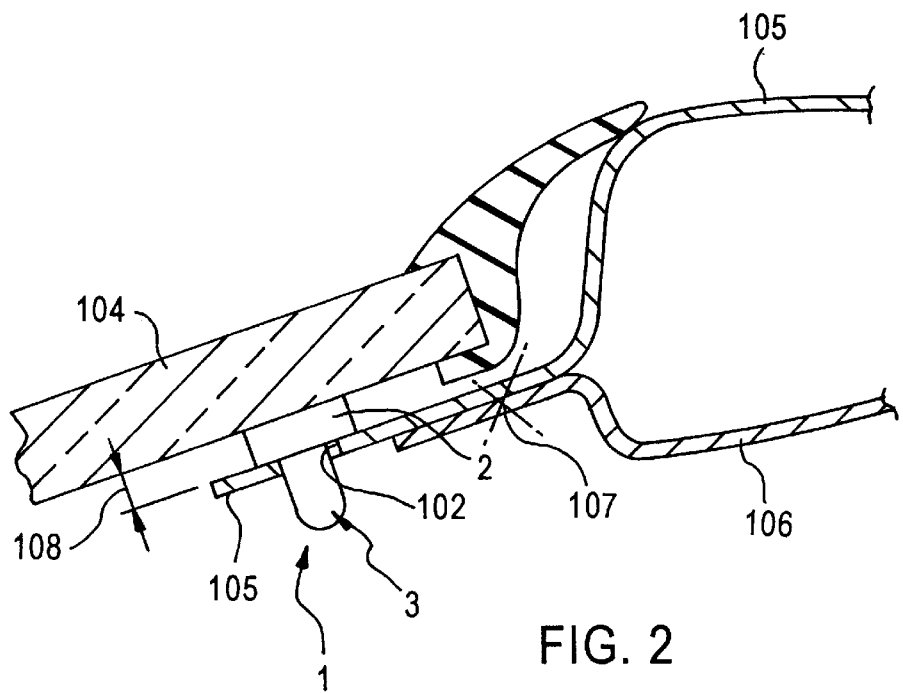
FIG. 2 is a sectioned side view through an automobile window assembly according to the invention.

Referring to FIG. 2, a head portion (2) of each locater pin (1) is adhered to a rear or inward facing side of a glass panel (104) for the window assembly. A number of locater pins are positioned around a periphery of the glass panel (104) for alignment with and receipt within the holes (102) or slots (103) in each frame. A stem portion (3) of each of the pins (1) is received with a respective hole (102) or slot (103). In this way the pins (1) are able to locate the window panel (104) relative to the frame (101). The frame (101) typically includes an outer steel panel (105) and an inner steel panel (106) which are spot welded together at a series of weld points (107) along the periphery of the frame. The steel panels (105, 106) are typically formed from sheet steel having a thickness of about 0.75 mm. The head portion (2) of each locater pin may provide a gap or space (108) of about 5 mm between the glass panel (104) and the outer frame panel (105) to be filled with a polyurethane sealer/spacer. The stem portion (3) of each pin typically has a diameter of about 6.2 mm. The diameter of the holes (102) is usually about 7 mm, although after the chassis has been painted this is generally reduced to about 6.8 mm.

Figure 3:
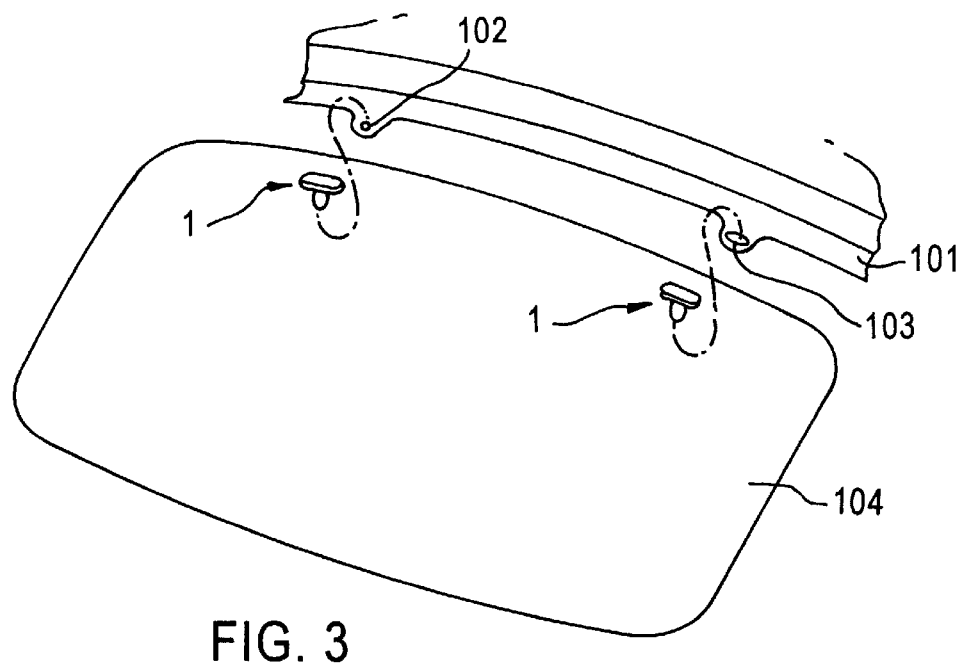
FIG. 3 is a perspective view of a window assembly according to the invention.

In the example shown in FIG. 3 a glass window panel (104), suitable for a windscreen or 'back-light', is located relative to the chassis frame (101) by two locater pins, one of which is inserted in a 7 mm hole (6.8 mm after painting) and the other of which is received in a 7 mm×14 mm lateral slot (6.8 mm×13.8 mm after painting). In this example no locater pin is required on the lower portion of the glass panel (104).

Figure 5:
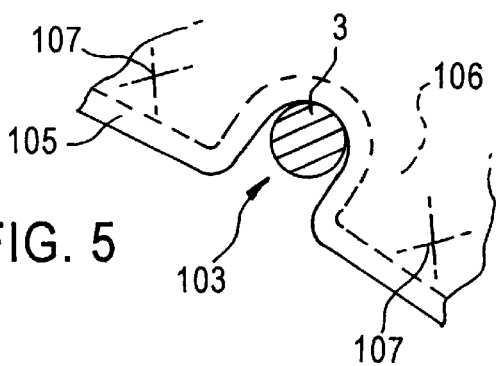
FIG. 5 is a detail of pin-receiving slot and locater pin (in section) in the window frame of FIG. 4.
Figure 4:
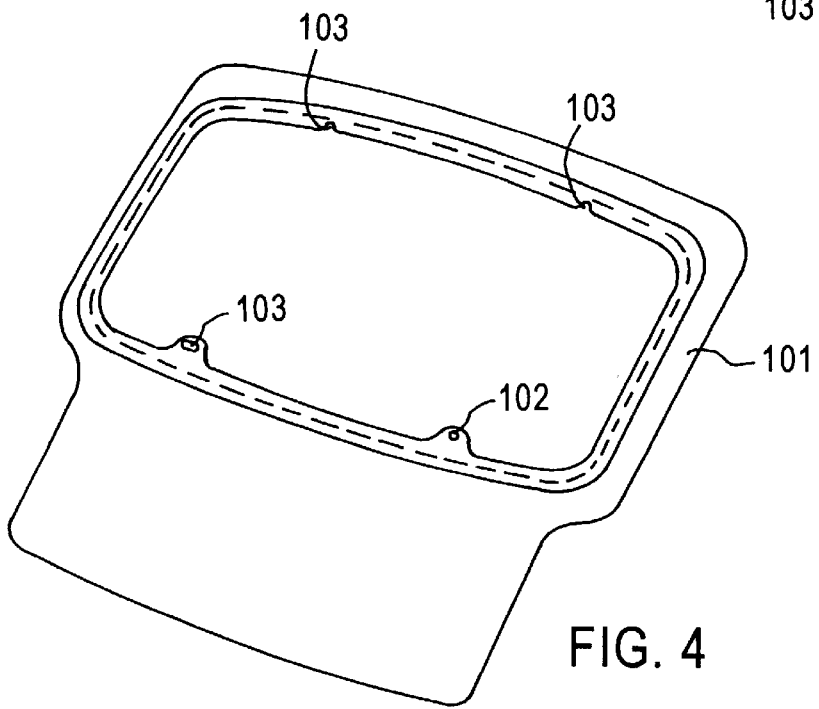
FIG. 4 is a perspective view of a wagon liftgate window frame for a window assembly according to the invention.

In the example of a wagon liftgate shown with reference to FIG. 4 and FIG. 5, two upper and two lower locater pins are provided since the liftgate may be moved during the vehicle fabrication/assembly process. Accordingly, additional locater pins give the glass panel (104) added stability against undesirable movement after A has been located in position in its frame (101).

Referring now to FIGS. 6 to 11, the present invention provides a locater pin (1) for locating a first article such as a glass panel with respect to a second article such as the frame of an automobile chassis defining a windscreen opening. The pin (1) has a head portion (2) for attachment to the glass panel and this attachment is usually by means of high strength adhesive such as Supa-glue™. The pin (1) also includes an elongate stem portion (3) which extends from the head portion (2) for receipt in an aperture such as a hole or slot in the chassis frame to property locate the glass panel relative to that frame. The head portion (2) of the locater pin includes a plate member (4) having a substantially flat top region (5) for adhesive attachment in face-to-face relation with an internal surface of the glass panel. The stem portion (3) is tapered at a free end (6) to assist insertion of the pin (1) into the hole or slot in the windscreen frame. The stem portion (3) also includes a flange member (7) which extends radially outward from a longitudinal axis A of the pin distal from the free end (6). The flange member (7) is adapted to seat against a peripheral edge region of the hole or slot in the windscreen frame and to hold the glass spaced from the frame a fixed distance.

The pin (1) of the present invention includes a stress dissipating failure means (8) which is adapted for shear fracture transverse of the longitudinal extent of the pin in the event of a greater than predetermined stress load arising, for example, from excessive vibration or transverse relative movement between the glass panel and the metallic frame after the glass panel has been located in the frame. The failure means (8) includes a region of reduced strength at which the pin is susceptible to fracture. That is, the failure means (8) includes a region of reduced cross-sectional area in the form of necked-in region (9) which extends between the flange member (7) of the stem portion and the plate member (4) of the head portion.

The locater pin (1) of the invention can also include fastening means (10) for retaining the pin in its associated hole or slat after insertion. In this case the fastening means (10) includes circumferential ribs (11) on the stem portion (3) for engagement with a fastening element (not shown) such as a star washer or threaded nut.

By providing the facility for fracture of the pin, the stresses caused by vibration and flexing of the chassis can be dissipated at the pin rather than being transmitted to the glass panel where they can lead to breakage of the glass. Accordingly, the delays and increased costs associated with breakages on the production line, and the damage to reputation and replacement costs associated with warranty returns from breakage in service can be minimised with the invention.

Finally, it is to be appreciated that various alterations, modifications and/or additions may be introduced into the construction and arrangement of the parts previously described without departing from the spirit or ambit of the present invention as described herein.

What is claimed is:

1. A locater pin for locating a first article with respect to a second article, including:
   a head portion for attachment to the first article;
   an elongate stem portion extending from the head portion for receipt in an aperture of the second article to properly locate the first article relative thereto;
   wherein the locater pin further includes stress dissipation means adapted to yield in the event that a stress load in excess of a predetermined limit is transmitted through the pin between the first and second articles to thereby prevent damage to either or both of said articles;
   wherein the stress dissipation means is in the form of failure means adapted to enable the pin to fail in the event that a stress load in excess of the predetermined limit is transmitted through the pin between the first and second articles;
   wherein the failure means is adapted to enable the pin to fail by fracture;
   wherein the failure means is adapted for shear fracture transverse a longitudinal extent of the pin in response to the stress load acting in a transverse direction;
   wherein the failure means is adapted to enable the pin to fracture in a region of the pin to be located between the first article and the second article; and
   wherein the failure means is located between the head portion and the stem portion of the pin.

2. A locater pin for locating a first article with respect to a second article, including:
   a head portion for attachment to the first article;
   an elongate stem portion extending from the head portion for receipt in an aperture of the second article to properly locate the first article relative thereto;
   wherein the locater pin further includes stress dissipation means adapted to yield in the event that a stress load in excess of a predetermined limit is transmitted through the pin between the first and second articles to thereby prevent damage to either or both of said articles;
   wherein the stem portion includes a flange member which extends radially outwards from a longitudinal axis of the pin, the flange member being adapted to seat against a peripheral edge region of the aperture in the second article.

3. A locater pin as claimed in claim 2 wherein the head portion includes a plate member having a substantially flat top region for adhesive attachment in face-to-face relation to the first article.

4. A locater pin for locating a first article with respect to a second article, including:
   a head portion for attachment to the first article;
   an elongate stem portion extending from the head portion for receipt in an aperture of the second article to properly locate the first article relative thereto;
   wherein the locater pin further includes stress dissipation means adapted to yield in the event that a stress load in excess of a predetermined limit is transmitted through the pin between the first and second articles to thereby prevent damage to either or both of said articles;
   wherein the stress dissipation means is in the form of failure means adapted to enable the pin to fail in the event that a stress load in excess of the predetermined limit is transmitted through the pin between the first and second articles;
   wherein the failure means includes a region of reduced strength rendering the pin susceptible to fracture in that region;
   wherein the stem portion includes a flange member which extends radially outwards from a longitudinal axis of the pin, the flange member being adapted to seat against a peripheral edge region of the aperture in the second article; wherein the head portion includes a plate member having a substantially flat top region for adhesive attachment in face-to-face relation to the first article; and wherein the failure means is located between the flange member of the stem portion and the plate member of the head portion.

5. A window assembly for a vehicle, including a window frame formed in a chassis of the vehicle and a glass panel positioned and secured in said frame, the window assembly further including at least one locater pin having a head portion attached to the glass panel and a stem portion extending from the head portion and received in an aperture in the frame to properly locate the glass panel relative to the frame; wherein the locater pin further includes stress dissipation means adapted to yield in the event that a stress load in excess of a predetermined limit is transmitted through the pin between the glass panel and the frame to thereby prevent damage to either or both of the glass panel and the frame;
   wherein the stress dissipation means of the locater pin is in the form of a failure means adapted to enable the pin to fail in the event of a stress load in excess of the predetermined limit is transmitted through the pin between the glass panel and the frame;
   wherein the locater pin head portion includes a plate member having a substantially flat top region for adhesive attachment in face-to-face relation to the glass panel, wherein the stem portion includes a flange member which extends radially outwards from a longitudinal axis of the pin such that the flange member seats against a peripheral edge region of the aperture in the frame, and wherein the failure means is located between the flange member of the stem portion and the plate member of the head portion.

6. A locater pin for locating a first article with respect to a second article, comprising:
   a head portion for attachment to the first article; and
   an elongate stem portion extending from the head portion for receipt in an aperture of the second article to properly locate the first article relative thereto;
   wherein the head portion of the locater pin further includes a stress dissipation structure adopted to rupture in the event that a stress load in excess of a predetermined limit is transmitted through the pin between the first and second articles to thereby prevent damage to either or both of said articles.

7. The locater pin of claim 6, wherein said stress dissipation structure is a reduced diameter portion in the head portion relative to a portion of said head portion adopted to be attached to the first article.

* * * * *